(12) United States Patent
Wall et al.

(10) Patent No.: US 11,710,117 B1
(45) Date of Patent: *Jul. 25, 2023

(54) SYSTEMS AND METHODS FOR EMV TERMINAL DEVICE TESTING USING EMV CARD EMULATION

(71) Applicant: Stripe, Inc., San Francisco, CA (US)

(72) Inventors: Jonathan Wall, San Francisco, CA (US); Ross Favero, Oakland, CA (US); Eric Glass, Denver, CO (US)

(73) Assignee: Stripe, Inc., San Francisco, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/328,764

(22) Filed: May 24, 2021

Related U.S. Application Data

(63) Continuation of application No. 16/523,460, filed on Jul. 26, 2019, now Pat. No. 11,017,380.

(51) Int. Cl.
*G06Q 20/34* (2012.01)
*G06Q 20/32* (2012.01)

(52) U.S. Cl.
CPC ..... *G06Q 20/3567* (2013.01); *G06Q 20/3278* (2013.01); *G06Q 20/341* (2013.01)

(58) Field of Classification Search
CPC ........... G06Q 20/3567; G06Q 20/3278; G06Q 20/341
See application file for complete search history.

(56) References Cited

U.S. PATENT DOCUMENTS

| 8,799,087 | B2 | 8/2014 | Martin |
| 9,449,320 | B1 | 9/2016 | Walter |
| 10,181,120 | B1 | 1/2019 | Holmes |
| 11,017,380 | B1 * | 5/2021 | Wall .................. G06Q 20/3567 |
| 2016/0189135 | A1 | 6/2016 | Hird |
| 2018/0068303 | A1 | 3/2018 | Wall et al. |

OTHER PUBLICATIONS

Non-final office action dated Sep. 10, 2020 in U.S. Appl. No. 16/523,460, filed Jul. 26, 2019.

* cited by examiner

*Primary Examiner* — Seung H Lee
(74) *Attorney, Agent, or Firm* — Womble Bond Dickinson (US) LLP

(57) ABSTRACT

A method and apparatus for EMV terminal device testing using a simulation of a plurality of EMV cards when interacting with an EMV terminal device emulator are described. The method may include establishing, by an EMV card emulator, an interface with the EMV terminal device emulator for the exchange of EMV card present transaction communications between the EMV card emulator and the EMV terminal device emulator. Furthermore, for each of a plurality of simulated EMV cards, the method may include exchanging one or more communications with the EMV terminal device emulator via the interface, wherein each communication simulates a communication generated by a simulated integrated circuit of an EMV card in response to a communication generated by the EMV terminal device emulator, and then causing at least one transaction to be run by the EMV terminal device emulator using the exchange of the one or more communications between the EMV card emulator and the EMV terminal device emulator.

17 Claims, 6 Drawing Sheets

SYSTEMS AND METHODS FOR EMV TERMINAL DEVICE TESTING USING EMV CARD EMULATION

CROSS-REFERENCE TO RELATED APPLICATIONS

This application is a continuation of U.S. patent application Ser. No. 16/523,460, filed on Jul. 26, 2019, the disclosure of which is incorporated herein, in its entirety, by reference.

BACKGROUND

Merchants, such as grocers, car services, dry cleaning services, etc., provide their products and services to customers for a fee. To collect fees for products or services provided, a merchant will typically enter an amount to be collected in a point of sale (POS) device, the POS device will communicate this data to a terminal device (e.g., a PIN pad terminal, PIN pad device, or other payment terminal), and a card reader of the terminal device will collect card data, such as Europay, Mastercard, or Visa data collected from a credit, debit, gift card, electronic benefits, or other payment instrument provided by the customer. In order to collect the card data, a magnetic strip, an integrated circuit (IC) of the card, or communications generated by a near field communications (NFC) interface is read by a card reader of the terminal device. Cards that include an integrated circuit (e.g., integrated circuit cards, or ICCs) and/or NFC capabilities may be referred to as EMV or "smart" cards because the IC and/or NFC capabilities include logic that enables the card to generate data during a transaction, and respond to requests of the card reader. EMV is a technical standard for smart payment cards, which include an IC or chip embedded into the card. The standard also applies to payment terminals (e.g., the terminal discussed above) and automated teller machines that can accept such smart payment cards. EMV stands for Europay, MasterCard, and Visa, who created the standard. Smart payment cards are referred to as "EMV cards," chip cards," IC cards, or ICCs, for example. That card data collected by the reader and any other data generated during the transaction is then used by the POS device and/or the terminal to authorize the transaction by, for example, further interacting with a commerce platform, card brand systems, issuing bank systems, etc., to ultimately approve and charge the fee for the merchant.

Card readers, terminal devices or PIN pad devices, and/or POS devices handle sensitive financial information during transactions, such as credit card numbers, and are therefore subject to certification requirements before they can be used by merchants. For example, a certification test for a card brand, bank, and or the payment card industry (PCI) data security standard involves performing several test transactions in which test cards interface with a reader (e.g. integrated circuit, magnetic strip, contactless interface, etc.), different transactions are run (e.g., charges for predetermined amounts, reversals, time-outs, etc.), and the data generated during the transaction by the card reader and/or terminal device is collected. The collected data is provided to a certification system, such as a testing and certification system associated with a card brand, a bank, a payment processor, or any organization that seeks to deploy the card reader and/or terminal device. The certification system then verifies that the right data in the right format is passed during certain stages of each transaction. When the collected data can be verified, the card reader and/or terminal device, and the software controlling the transactions, can be certified as functioning properly so that the terminal device can be deployed by a merchant and/or used with a POS device of the merchant.

The above described certification process is labor intensive, as it typically involves a human operator repeatedly running a series of transactions with different physical cards. This becomes even more labor intensive as new/updated software for controlling transaction flow in a card reader and/or terminal device is updated, as new reader, terminal device, and/or POS devices are deployed to a merchant, or a combination thereof. For example, user interface changes, transaction processing changes, new hardware device integration, etc. may each require new certifications.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
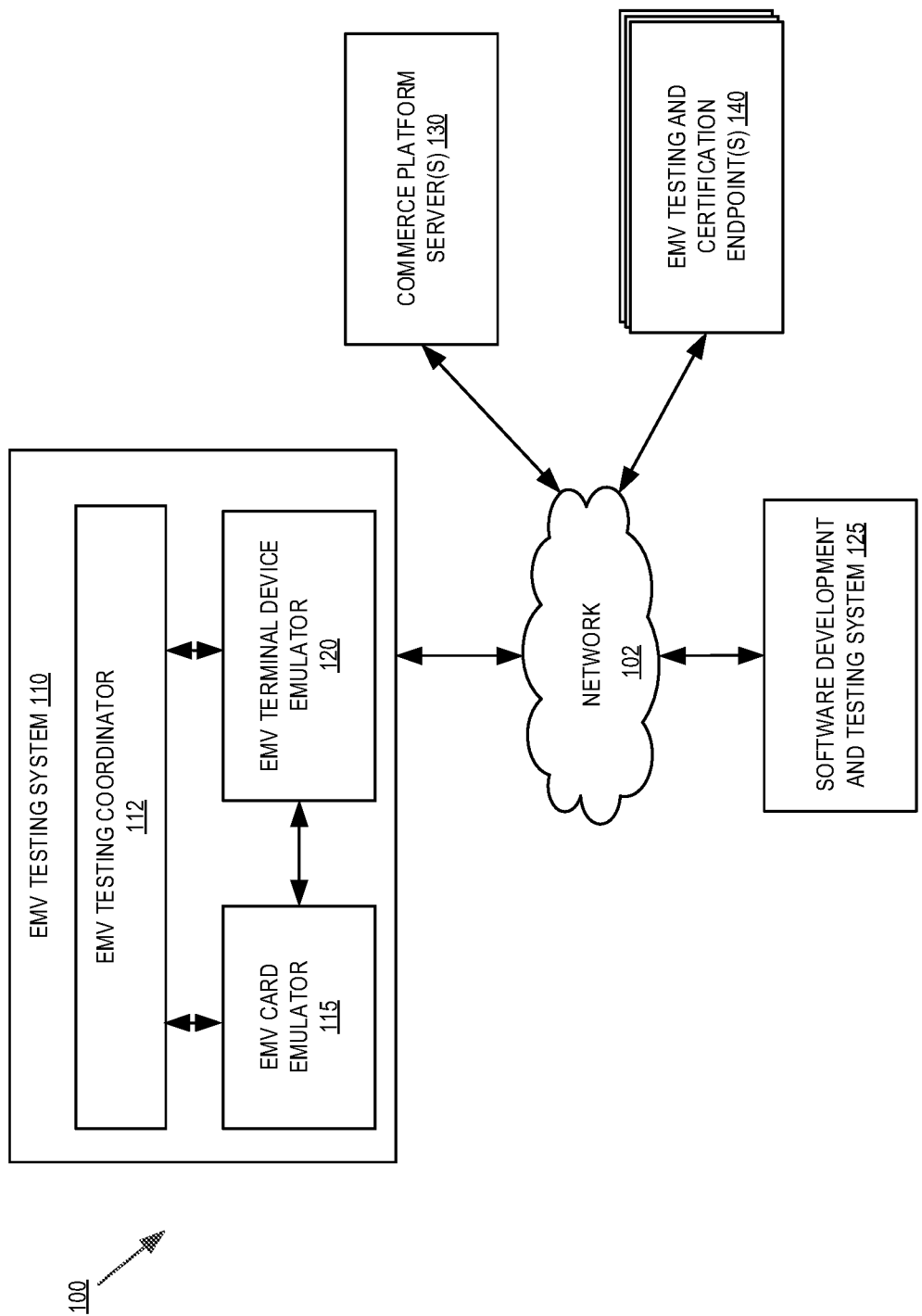
FIG. 1 is a block diagram of an exemplary system architecture for EMV emulation and testing using an EMV emulator system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "establishing", "exchanging", "causing", "simulating", "verifying", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for EMV emulation and testing using an EMV testing system 110.

In one embodiment, the system 100 includes EMV testing system 110, commerce platform servers 130, software development and testing system 125, and one or more EMV testing and certification endpoint(s) 140. In embodiments, EMV testing system 110, software development and testing system 125, commerce platform server(s) 130, and EMV testing and certification endpoint(s) 140 are computing devices, such as server computers, desktop computers, etc. that include typical computing hardware (e.g., one or more processors, memory, a communications bus, a network interface, etc.), as illustrated and discussed with respect to FIG. 5 below.

In embodiments, EMV testing system 110 includes an EMV card emulator 115, an EMV terminal device emulator 120, and an EMV testing coordinator 112. EMV testing system 110 is a computing device, such as a server computer, desktop computer, specialized hardware device, etc.

Although EMV card emulator 115, EMV terminal device emulator 120, and EMV testing coordinator 112 are illustrated as being part of a single EMV testing system 110, in embodiments, one or more of EMV card emulator 115, EMV terminal device emulator 120, and EMV testing coordinator 112 may be executed by separate computing devices, and communicate with one another via network 102. In another embodiment, one or more of EMV card emulator 115, EMV terminal device emulator 120, and an EMV testing coordinator 112 may be executed by separate virtual computing devices on the same or different computer system, where virtual instance of one or more of EMV card emulator 115, EMV terminal device emulator 120, and EMV testing coordinator 112 may be created based on testing load, testing scenario, geographical constrains, etc. However, to avoid obscuring the features of the present disclosure, the discussion will utilize the exemplary embodiment of EMV card emulator 115, EMV terminal device emulator 120, and EMV testing coordinator 112 operating within the same computing device executing the EMV testing system 110.

Figure 6:
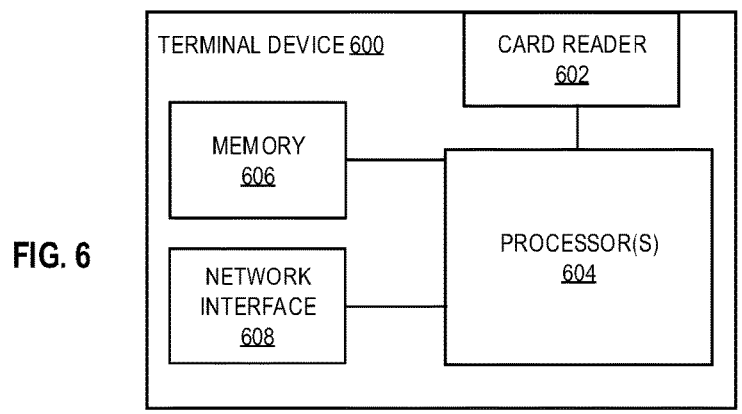
FIG. 6 is one embodiment of a terminal device that may be used to support the systems and operations discussed herein.

In embodiments, EMV terminal device emulator 120 may be a virtualized or simulated EMV terminal device in which the hardware components illustrated in the exemplary EMV terminal device 600 of FIG. 6 are virtual or simulated components executed by a computer system. In embodiments, EMV terminal device emulator 120 implements a card-present transaction process by executing an EMV kernel (e.g., EMV kernel 216 as discussed in greater detail herein) where card data is collected from EMV card emulator 115 and used during a simulated transaction. As discussed herein, EMV card emulator 115 simulates one or more physical EMV cards. EMV cards, also referred to as "smart cards", typically include an integrated circuit (IC), near field communication (NFC) interface, a magnetic strip, or a combination, which are each simulated by EMV card emulator 115 to simulate physical EMV card(s) capable of interacting with simulated hardware components (e.g., magnetic strip reader, IC interface, NFC interface, etc.) of the EMV terminal device emulator 120 during a PCI compliant transaction flow. For example, during the transaction flow between the EMV card emulator 115 and the EMV terminal device emulator 120, data is exchanged between an emulated EMV card and an emulated EMV terminal device including an interface being established (e.g., IC to reader device interface, NFC interface, etc.), transaction parameters being negotiated, encryption keys being exchanged, identifiers being exchanged, and data further being exchanged between the EMV terminal device emulator 120 with card brand systems, banks, commerce platform 130, etc. However, in embodiments, data is not exchanged with external systems during EMV card simulation and EMV terminal device testing, and instead a record of communications that would be exchanged with such external systems is stored by EMV testing coordinator 112 of EMV testing system 110. Embodiments of techniques and systems for an EMV terminal device which may be simulated by EMV terminal device emulator 120, including vector kernels for performing transaction processing with EMV card emulator 115, are described in U.S. Patent Application No. 2018/0068303, filed on Sep. 8, 2017, titled "EMV KERNEL FOR FASTER PROCESSING," the disclosure of which is incorporated by reference in its entirety.

In one embodiment, the vector kernel executed by EMV terminal device emulator 120 for transaction processing is developed by engineers associated with commerce platform server(s) 130, for example, using software development and testing system 125. In embodiments, software development and testing system 125 is a computer processing system, server computer, etc. that manages software development processes. For example, software development and testing system 125 can manage versioning, compilation, rollback, bug reporting, error ticket distribution, tracking, clearance, and other processes typically associated with software development. Thus, engineers associated with the development of the vector kernel and/or other software for use by an EMV terminal device (e.g., terminal device 600) may therefore edit various aspects of the software to be executed by the EMV terminal device, for example, to customize an operating system, customize interfaces for a specific card brand, merchant, etc., refine/update the vector kernel for transaction processing improvements, as well as for other tasks in which software may be edited, recompiled, and then distributed to EMV terminal devices.

Once a software update is available from software development and testing system 125, it may be installed on EMV terminal device emulator 120 for testing. Similarly, EMV terminal device emulator 120 may emulate a new device not yet deployed by merchants, commerce platform, or others, and an existing software version of software development and testing system 125 may be installed on the new EMV terminal device emulator 120 for testing the hardware operations of the new device. In embodiments, certification requirements from card brands, merchants, commerce platform, as well as other systems involved with transaction processing may include verification of device configurations, encryption protocols, the proper execution of transactions for a number of test cases, generation of expected results in the test cases, data exchanged during transactions meeting certain requirements, or other factors that are required to be verified for certification purposes. Similarly, Payment Card Industry (PCI) compliance may also be required to be satisfied for newly developed software.

Therefore, in one embodiment, EMV terminal device software to be tested is installed on EMV terminal device emulator 120 by software development and testing system 125 using EMV testing coordinator 112, as discussed herein. In one embodiment, EMV testing system 110 simulates a plurality of EMV cards using EMV card emulator 115 for executing a plurality of different predefined transactions by the EMV terminal device emulator 120 for software being tested (e.g. an updated OS, an updated vector kernel, a new device running new/existing software, etc.). In one embodiment, EMV testing system 110 may be executed as a virtual machine on a computer processing system, and therefore hardware components of the EMV card emulator 115 (e.g. ICs, magnetic strips, NFC components, etc.) and EMV terminal device emulator 120 (e.g., IC reader, network interface(s), processor, memory, display, vector kernel, OS executed by the reader device's processor, etc.) may be simulated. EMV testing system 110 then executes a testing process of EMV testing coordinator 112 that configures transactions between the EMV terminal device emulator 120 being tested (e.g. transaction type, amount, etc.), and configures one or more simulated EMV cards emulated by EMV card emulator 115 during each of the transactions. For example, the simulated transactions can include running a sequence of different transaction types (e.g., purchase, refund, cancellation, etc.) using different simulated EMV cards (e.g., numbers, card brands, card owners, etc.) for generating data provided to EMV terminal device emulator 120 consistent with the different stages of transaction processing during the simulated transaction(s). For example, EMV card emulator 115 and/or EMV terminal device emulator 120 simulate stages of EMV transactions including IC insertion into a reader of an EMV terminal device, negotiating parameters of communication, generating dynamic responses to/from EMV terminal device emulator 120 and EMV card emulator 115 (e.g., generating checksums, supplying data, etc. by an emulated IC and/or an emulated vector kernel), interacting with EMV testing and certification endpoint(s) 140 and/or commerce platform server(s) 130 (e.g., to test the establishment of connections, data exchange, etc. with remote systems), as well as generating other data as would be generated by an EMV card and/or EMV terminal device during a transaction process. That is, the EMV card emulator 115 and EMV terminal device emulator 120 of EMV testing system 110 simulate the typical messaging and data generation that would be performed by a physical EMV card's IC, NFC interface, or magnetic strip during the transaction flow implemented by the vector kernel executed by a physical EMV terminal device. However, EMV testing system 110 performs the card simulation, for example using a virtualized computing environment, a standalone application, a physical computing device, different virtual or remote computing device communicatively coupled with on another via a network, etc., so that any number of cards, transactions, and messaging can be simulated during test transactions run on EMV terminal device emulator 120 by EMV testing system 110.

In one embodiment, EMV testing system 110 may further include testing management using EMV testing coordinator 112. For example, different card brands, different merchants, different commerce platforms, the PCI, etc. may each have their own compliance requirements, such as specific transactions (e.g., purchases, returns, time outs, rejections, etc.) that must be performed correctly for certification to occur. Furthermore, different terminal devices, new terminal devices, planned regional deployments, etc. may also have their own compliance and/or transaction requirements (e.g., based on local laws, customer requirements, etc.). Thus, in embodiments, any number of different certification tests may be configured to be run by EMV testing coordinator 112 of EMV testing system 110 that define a number of cards, the characteristics of each card, transactions and transaction parameters for a plurality of tests, etc. to be simulated by EMV card emulator 115 and/or EMV terminal device emulator 120 based on the requirements associated with the certification being performed.

In embodiments, the expected transaction flow, data generated during a transaction, transaction output, etc. are known for each testing case. That is, for each stage of a vector kernel execution of a transaction flow, the data, communications, etc. at each stage have a known type/output. Therefore, in embodiments, failure to satisfy the expected transaction parameters is used by EMV testing coordinator 112 of EMV testing system 110 to generate ticket(s) and/or bug reports that are provided to software development and testing system 125. In embodiments, the ticket(s) and/or bug reports can identify the test scenario, card brand, vector kernel version being tested, vector kernel process operation, output data, or any other information from the test case in which the error was encountered. In embodiments, this information may be used by software development and testing system 125 to assign the bug report and/or ticket to specific software developers and/or departments associated with characteristics of the error, version of the vector kernel, etc. For example, developers responsible for software in the vector kernel for performing cardholder verification would receive ticket(s)/report(s) when errors are encounter at that stage of testing for simulated card/card(s), errors/bugs in processing card interface establishment would similarly be directed to the appropriate software developers and/or team, errors/bugs in the exchange and usage of encryption keys and/or checksums would also be directed to the appropriate software developers and/or team, and so on.

However, in embodiments, where no errors and/or bugs are detected for a testing sequence, the testing results may be used by EMV testing coordinator 112 of EMV testing system 110 to generate a settlement file. In embodiments, the settlement file is provided to EMV testing and certification endpoint(s) 140 to verify the data within the settlement file. For example, a card brand can verify that the transactions, data generated during transactions, communication protocols, device configurations, etc. satisfy certification requirements for performing card present transactions using EMV terminal devices (e.g., those of the same type simulated by EMV terminal device emulator 120) and executing transaction processing software associated with the tested software (e.g., a tested operating system version, a tested vector kernel version, etc.).

In embodiments, different classes or models of EMV terminal devices may be subject to their own certification before deployment and use during transactions. Similarly, existing devices may also be subject to their own certification before software updates may be distributed to those devices. In embodiments, the testing and simulation of EMV cards for specific transaction sequences using different simulated EMV terminal devices, as described herein, greatly improves the efficiency of testing and/or certifying EMV transaction processing by new and/or updated software and/or hardware systems. Furthermore, customization of testing scenarios is enabled, so that each card brand, commerce platform, issuing bank, the PCI, etc., can have their certification requirements tested and fulfilled using the testing system described herein. Additionally, in the event an error does occur in software being tested, the reporting and routing of the error reports is improved by directing the reports to responsible parties for enabling a more efficient software development, testing, and deployment cycle.

Figure 2:
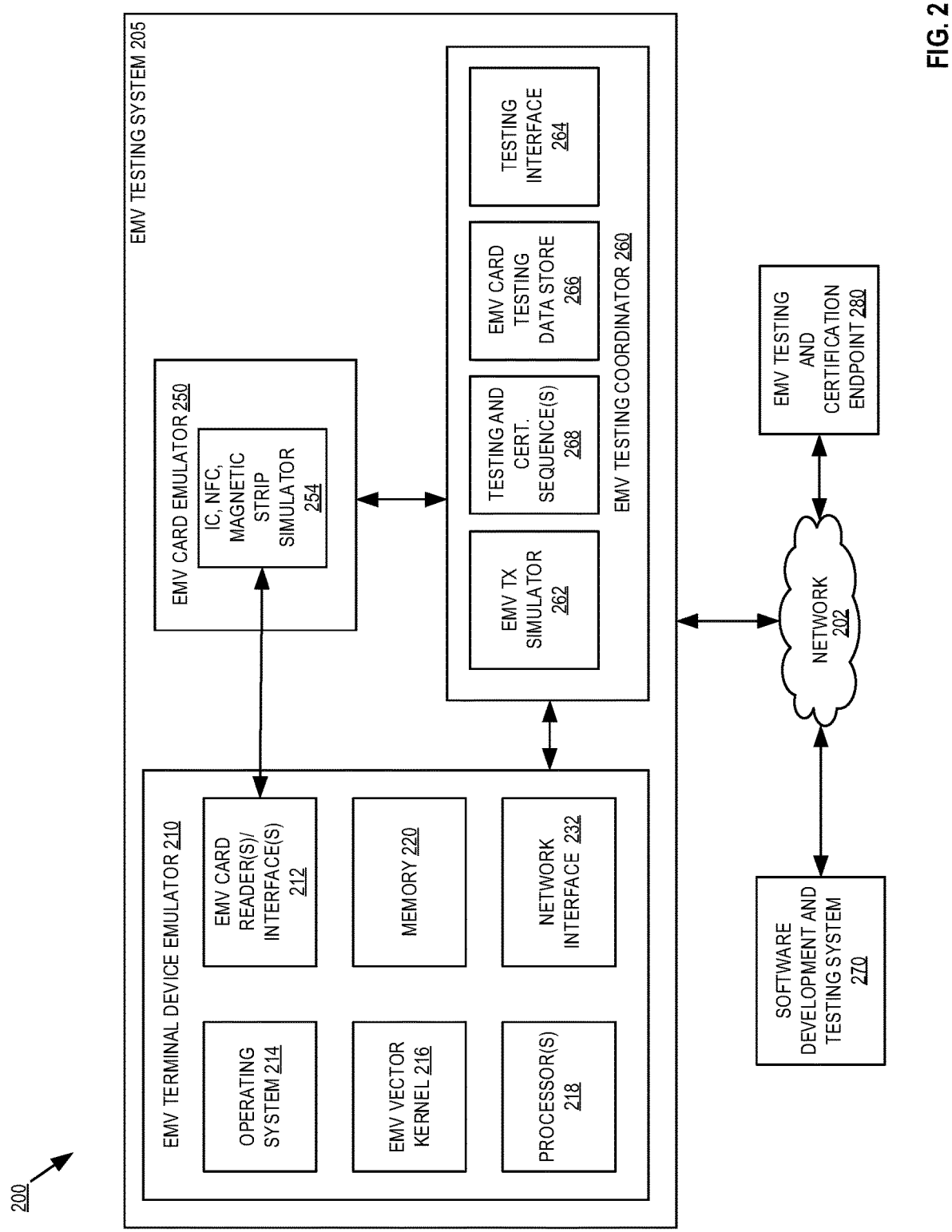
FIG. 2 is a block diagram of one embodiment of a system for performing testing of an emulated EMV terminal device using an EMV card emulator.

FIG. 2 is a block diagram of one embodiment 200 of a system for performing testing of an EMV terminal device using an EMV testing system 205. As discussed herein, EMV testing system 205 enables customizable and rapid testing of the configuration, hardware, and software of an EMV terminal device using EMV terminal device emulator 210, EMV card emulator 250, and EMV testing coordinator 260 for simulation of one or more card present transaction(s). EMV terminal device emulator 210, EMV card emulator 250, and EMV testing coordinator 260 provide additional details for the EMV terminal device emulator 120, EMV card emulator 115, and EMV testing coordinator 112 discussed herein.

In one embodiment, EMV terminal device emulator 210 is an emulated system, executed by EMV testing system 205, which may include emulation of one or more processors 218, memory 220, network interface 232, EMV card reader(s)/interface(s) 212 (e.g., IC, NFC, magnetic strip interfaces), as well as emulation of other components typically associated with terminal device(s) (e.g., power supply, communications bus, user interface, buttons, etc.). EMV terminal device emulator 210 may include a number of processing modules, such as operating system 214 and EMV vector kernel 216 of EMV terminal device emulator 210. EMV terminal device emulator 210 may simulate being communicatively coupled, via emulated network interface 232, to a number of other systems, such as EMV card emulator 250, EMV testing and certification endpoint 280, and/or software development and testing system 270 to transmit and receive data through an emulated and/or actual wired and/or wireless link to/from a network 202 (e.g., the Internet, Ethernet, or other wireless systems).

In one embodiment, EMV card emulator 250 is also an emulated system, executed by EMV testing system 205, which may include execution of IC, NFC, magnetic strip simulator 264 to transmit and receive dynamic and static data to/from EMV terminal device emulator 210, such as the data exchanged between an EMV card's IC, magnetic strip, NFC link, etc. with a EMV terminal device's interface during a typical EMV card present transaction. In embodiments, the IC, NFC, and magnetic strip simulator 264 emulates the operations performed, signals generated by, data stored on, etc. corresponding physical ICs, NFC interfaces, magnetic strips, etc.

Figure 5:
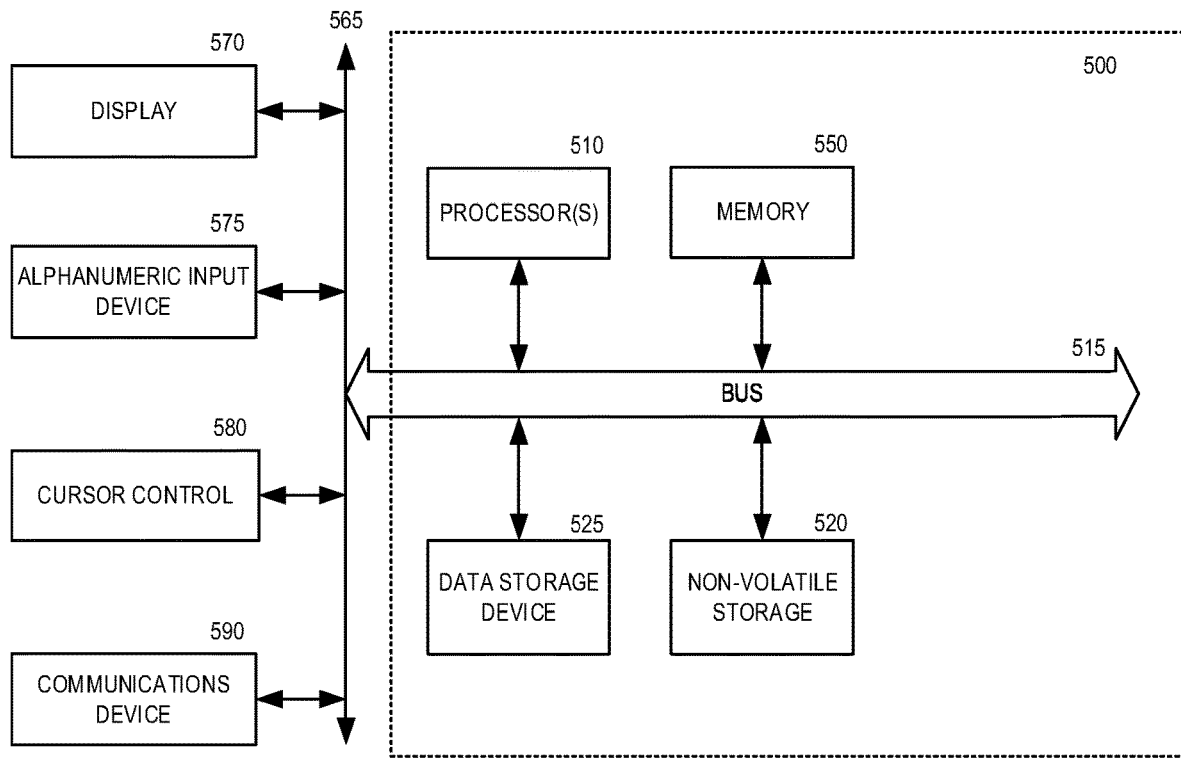
FIG. 5 is one embodiment of a computer system that may be used to support the systems and operations discussed herein.

It should be appreciated that embodiments of the invention as will be hereinafter described may be implemented through the execution of instructions, for example as stored in a memory, and executed by processor(s), of EMV testing system 205, and/or other circuitry of EMV testing system 205. Particularly, circuitry of EMV testing system 205 may operate under the control of a program, routine, or the execution of instructions to execute methods or processes in accordance with embodiments of the invention to emulate the hardware and/or software resources of EMV terminal device emulator 210 and EMV card emulator 250. For example, such a program may be implemented in firmware or software (e.g. stored in a memory) and may be implemented by processors and/or other circuitry of EMV testing system 205. Further, it should be appreciated that the terms processor, microprocessor, circuitry, controller, etc., may refer to any type of logic or circuitry capable of executing logic, commands, instructions, software, firmware, functionality and the like. FIG. 5 illustrates an embodiment of a system that may be used to implement EMV testing system 205.

EMV testing and certification endpoint 280 and software development and testing system 270 are also computing devices, such as server computer systems, communicatively coupled with network 202 for exchanging data with EMV testing system 205.

In some embodiments, one or more of EMV terminal device emulator 210, EMV card emulator 250, and EMV testing coordinator 260 may be an application, a virtual machine, a virtualized device, etc. executed by one or more processor(s) of EMV testing system 205. One embodiment of an EMV terminal device emulated by EMV testing system 205 is illustrated and discussed with respect to FIG. 6 below.

In embodiments, software development and testing system 270 is responsible for generating software updates, such as by the development of engineers associated with a commerce platform (e.g. a system for processing card present transactions), to the operating system 214, EMV vector kernel 216, and/or other software systems executed by EMV terminal device emulator 210. The updates, prior to usage and/or distribution to EMV terminal devices at merchant locations, are therefore received by testing interface 264 of EMV testing coordinator 260, and installed on EMV terminal device emulator 210 of EMV testing system 205 for testing purposes.

In embodiments, EMV testing and certification sequences 268 of EMV testing coordinator 260 then initiates a certification testing process. In embodiments, the testing may be a general/all-purpose testing process, a selected testing process configured based on the type of operating system executed by the EMV terminal device emulator 210, a selected testing process configured based on the version of the EMV vector kernel 216, a selected testing process configured based on future deployment characteristics (e.g., associated merchant, geographic region, etc.), a selected testing process configured based on model and/or type of EMV terminal device being emulated, a testing sequence associated with a specific compliance requirement (e.g., merchant, geographic, PCI, etc.), or a combination of factors. As discussed herein, testing and certification sequences 268 accesses EMV testing data store 266, which stores card data for simulation of EMV cards during testing. Testing and certification sequence(s) 268 then configures the EMV card emulator 250 with card specific data for each transaction to be simulated. Then, EMV transaction (TX) simulator causes IC, NFC, magnetic strip simulator 264 of EMV card emulator 250 to interface with EMV terminal device emulator's 210 EMV card reader(s)/interface(s) 212 to simulate the interfacing of those two systems. In embodiments, the simulated interface may be a simulated hardware interface that enables direct communications between EMV card emulator 25 and EMV terminal device emulator 210, such as through a configurable NFC interface, a configurable IC interface, a programmable magnetic strip, etc.

In either embodiment, EMV transaction simulator 262 further provides transaction data (e.g., such data as may be received from a POS device for a transaction) to EMV terminal device emulator 210 to initiate the transaction process performed by EMV vector kernel 216 (such as communicating a transaction type, a transaction amount, etc.). In embodiments, vector kernel 216 performs a series of operations in a transaction flow to process the transaction, such as powering a reader interface, setting clock signals, performing negotiations with an EMV card, selecting an application to perform processing that may or may not be based on a type of simulated card (e.g., europay card, master card, visa card, American express, gift cards, etc.), as well as other operations performed by a kernel that performs transaction processing. Embodiments of operations performed by a vector kernel during transaction processing are described in U.S. Patent Application No. 2018/0068303, filed on Sep. 8, 2017, titled "EMV KERNEL FOR FASTER PROCESSING," the disclosure of which is incorporated by reference in its entirety.

In embodiments, EMV card emulator 250 then interacts with the EMV vector kernel 216 of EMV terminal device emulator 210 through the simulated interface by simulating responses to the operations performed by the EMV vector kernel 216. For example, if EMV vector kernel 216 requests the generation of a checksum, EMV card emulator 250 responds accordingly with a checksum generated from data associated with a simulated card, data received from EMV vector kernel 216, etc. Therefore, EMV card emulator 250 provides the EMV vector kernel 216 data (e.g. static data, such as card data, identifiers, encryption keys, magnetic strip data, etc., and dynamic data, such as requested computations generated by an IC, NFC interface, etc.) consistent with the operations performed by an IC and/or NFC logic of an EMV card when interacting with the EMV vector kernel 216, which are provided to the EMV terminal device emulator via IC, NFC, magnetic strip simulator 254.

In embodiments, the data generated by EMV card emulator 250 and provided to EMV terminal device 210 via the interface therefore provides the expected data in the expected format at the times expected by EMV vector kernel 216 during transaction processing. Furthermore, this data is supplied by the EMV transaction simulator 262 for any number of unique transactions (e.g., purchases, refunds, time outs, etc., unique simulated EMV cards (e.g. cards of different types, different issuing banks, different card numbers, etc.), unique interface methods (e.g., IC, NFC, magnetic strip), etc., as well as sequences of transactions maintained in testing and certification sequences 268. Additionally, based on testing scenario, different sequences of transactions and simulated card data may be used by EMV card emulator 250 and EMV terminal device emulator 210.

In embodiments, EMV vector kernel 216 may further interact with EMV testing and certification endpoint 280, such as by forwarding charges to EMV testing and certification endpoint 280 as would normally be performed in an actual transaction, but which are provided to systems configured for participating in card present transaction testing. In other embodiments, the communications that would be transmitted to a remote system, such as EMV testing and certification endpoint, are instead captured by EMV testing coordinator 260, and recorded to a settlement file.

In embodiments, the data generated during transaction processing by EMV vector kernel 216, the provided response generated by EMV card emulator 250, communications exchanged with or destined for EMV testing and certification endpoint 280, transaction results, etc. is collected into a settlement file by testing interface 264 of EMV testing coordinator 260. The settlement file may then be communicated to EMV testing and certification endpoint 280 for certification of the software being tested by execution of the EMV terminal device emulator 210, for certification of an updated vector kernel or other software system to be deployed on EMV terminal devices.

In embodiments, where an error occurs during testing, such as failure to generate and/or received expected data, perform expected transaction operations, obtain certain transaction results, operation timing errors, etc., testing and certification sequences 268 generates a bug report and/or issue ticket, which is provided to testing interface 264. This bug report and/or issue ticket may then be communicated by testing interface 264 to software development and testing system 270. Furthermore, in embodiments, the settlement file is not transmitted to EMV testing and certification endpoint 280 for certification purposes until execution of a testing scenario does not generate relevant bug reports/issue tickets.

Figure 3:
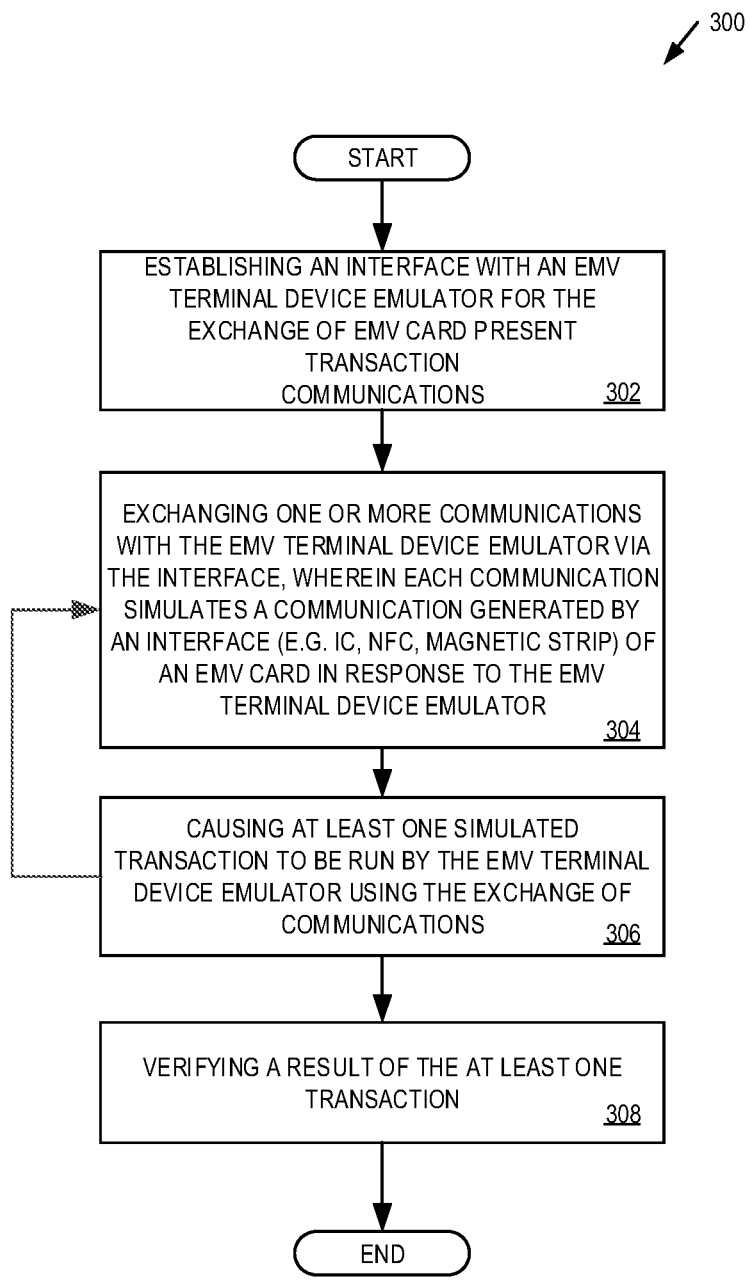
FIG. 3 is a block diagram of one embodiment of a process for simulating a plurality of EMV card present transactions by an EMV card emulator during testing of an emulated EMV terminal device.

FIG. 3 is a block diagram of one embodiment of a process 300 for simulating a plurality of EMV card present transactions by an EMV card emulator during testing of an emulated EMV terminal device. The process 300 is performed by processing logic that may comprise hardware (circuitry, dedicated logic, etc.), software (such as is run on a general-purpose computer system or a dedicated machine), firmware, or a combination thereof. In one embodiment, the method 300 is performed by an EMV testing system (e.g., EMV testing system 110 or 205). Furthermore, as discussed herein, the EMV testing system may execute one or more device emulator(s), such as a EMV terminal device emulator, an EMV card emulator, or a combination thereof, as virtual computing devices.

Referring to FIG. 3, processing logic begins by establishing an interface with an EMV terminal device emulator for the exchange of EMV card present transaction communications (processing block 302). In one embodiment, processing logic of an EMV testing system includes a virtualized or simulated interface, such as a virtualized magnetic strip, virtualized IC and/or a virtualized NFC interface of an emulated EMV terminal device for establishing the interface with an emulated EMV card.

Processing logic exchanges one or more communications with the EMV terminal device emulator via the interface, wherein each communication simulates a communication generated by an interface of an EMV card in response to the EMV terminal device emulator (processing block 304). In embodiments, processing logic includes the logic of an IC and/or NFC interface of an EMV or smart card, such as that provided by the EMV card emulator discussed in greater detail herein. Furthermore, processing logic can include logic simulating the storage of data within an emulated magnetic stip. That is, processing logic is configured to execute the same/similar functions as the magnetic stip, IC and/or NFC interface of an EMV card so that in response to communications of EMV terminal device emulator, for example those generated by a vector kernel during a transaction flow, processing logic can respond with the appropriate data. For example, processing logic can be configured to negotiate parameters with the EMV terminal device emulator for a transaction, generate checksums, provide identifiers for cards, etc., as would be expected by the vector kernel during a transaction flow.

Processing logic then causes at least one transaction to be run by the EMV terminal device emulator using the exchange of communications (processing block 306). In embodiments, the transaction corresponds to a simulated transaction using the emulated EMV card. For example, the EMV terminal device emulator subject to testing may be configured to perform a transaction with specified characteristics (e.g., transaction type, card type, amount, hardware configuration, etc.). The transaction having the characteristics may then be run utilizing the emulated EMV card and data generated by the simulated card to, for example, collect and/or determine whether the EMV terminal device being emulated and/or software executing on the EMV terminal device being emulated are functioning as expected.

As discussed herein, processing logic can simulate a plurality of cards having unique card numbers, different brands, different issuing banks, different capabilities, etc. These may each be used for selecting and/or configuring one of a plurality of different transaction sequences for testing different EMV terminal devices, different software run by the EMV terminal devices, regional requirements, PCI requirements, card brand requirements, etc. Therefore, in embodiments, the process may return to processing block 304 to exchange communications with EMV terminal device for another simulated transaction and emulated EMV card.

Processing logic then verifies a result of the at least one transaction (processing block 308). As discussed herein, processing logic knows the data, data types, timing, etc. of the messaging that should occur between the vector kernel and an emulated EMV card during a successful transaction flow. Therefore, in embodiments, data values generated at stages of a transaction flow, timing of messaging within the transaction flow, message types, transaction flow stage results, overall transaction results, etc. may each be compared with expected results. When this occurs, processing logic can verify the result of the at least one transaction.

Figure 4A:
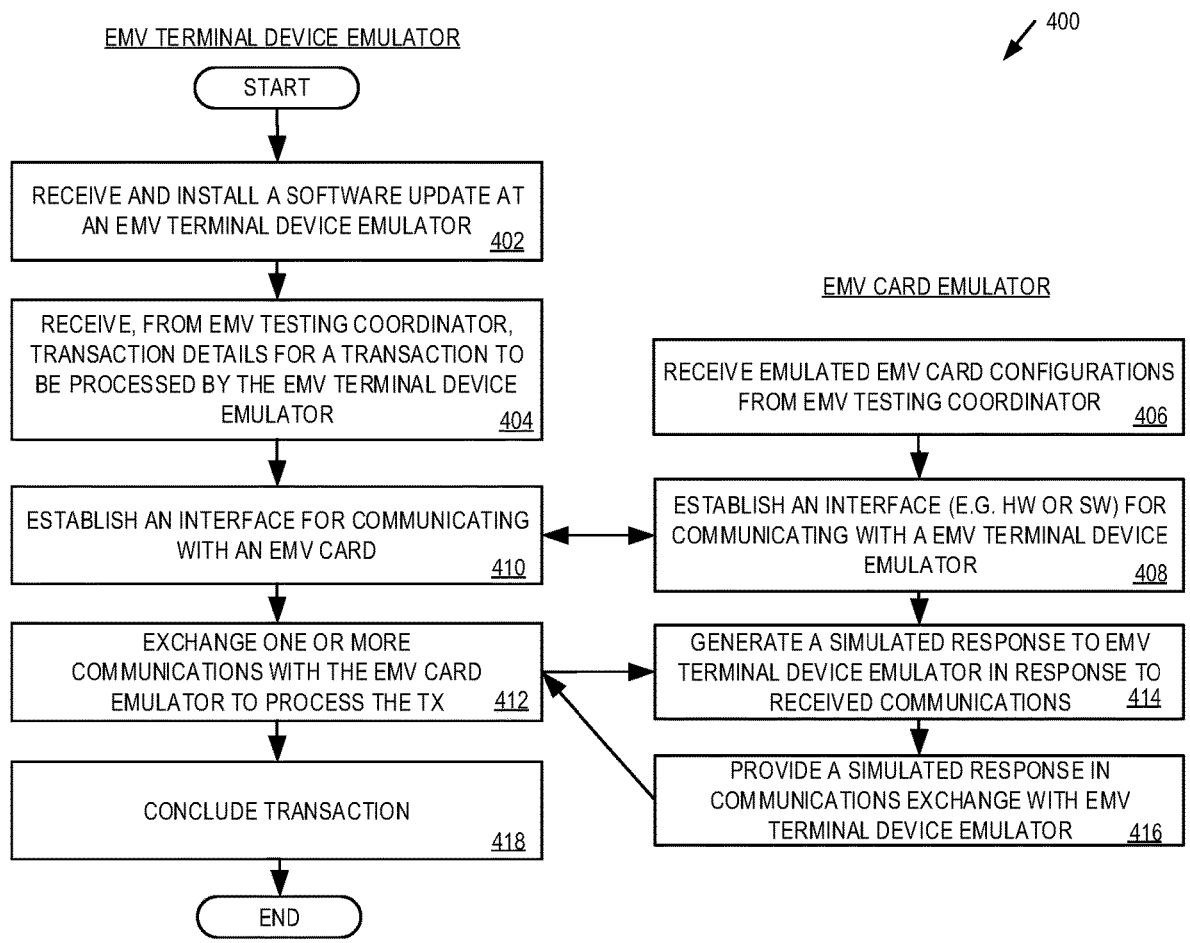
FIG. 4A is a block diagram of an embodiment of a process for simulating an EMV card present transaction during testing using an EMV terminal device emulator and an EMV card emulator.

FIG. 4A is a block diagram of an embodiment of a process 400 for simulating an EMV card present transaction during testing using an EMV terminal device emulator and an EMV card emulator. The process 400 is performed by processing logic that may comprise hardware (circuitry, dedicated logic, etc.), software (such as is run on a general-purpose computer system or a dedicated machine), firmware, or a combination thereof. In one embodiment, the process 400 is performed by an EMV terminal device emulator and an EMV card emulator (e.g., EMV terminal device emulator 120 or 210 and EMV card emulator 115 or 250) of an EMV testing system (e.g., EMV testing system 110 or 205). Furthermore, as discussed herein, processing logic may be executed as a virtual computing device configured for execution and simulation of hardware components of emulated EMV cards and emulated EMV terminal devices, as discussed herein.

Referring to FIG. 4A, processing logic of the EMV terminal device emulator begins by receiving and installing a software update at the EMV terminal device emulator (processing block 402). The software update may include one or more changes to an operating system, vector kernel, or other software of the EMV terminal device. Furthermore, the update may be installed and/or managed by a testing coordinator (e.g., EMV testing coordinator 112 or 260), where the updates are received from a software development and testing system, such as that used by engineers associated with a commerce platform that distributes and/or manages EMV terminal devices and associated software systems to merchants (e.g., software development and testing system 125 or 270).

Processing logic of the EMV terminal device emulator receives transaction details for a transaction to be processed by the EMV terminal device emulator (processing block 404). In embodiments, the transaction details may be received from an EMV testing coordinator. In embodiments, the transaction details are those that would typically be provided to an EMV terminal device from a POS device to initiate a transaction flow for a card present transaction. For example, the transaction details can include transaction amount, whether the transaction is a charge, credit, refund, etc., what the accepted card types are, as well as other transaction details. Furthermore, and as discussed herein, the transaction details may be associated with a single transaction, a transaction in a sequence of transactions, a testing sequence for a specific card type, card brand, PCI compliance, etc.

Processing logic of the EMV card emulator also receives EMV card configurations from the EMV testing coordinator (processing block 406). In embodiments, the EMV card configurations can include configuration of an IC, magnetic strip, NFC logic, etc. to be simulated during a transaction, a card type, card numbers, expiration dates, name associated with the card, pin numbers, etc. Furthermore, and as discussed herein, the EMV card configurations can be for a single transaction, a transaction in a sequence of transactions, a testing sequence for a specific card type, card brand, PCI compliance, etc.

Processing logic of the EMV terminal device emulator and the EMV card emulator then establish an interface for communicating with one another (processing blocks 408 and 410). In embodiments, the interface may be a communications interface established using software based messaging (e.g., one or more APIs that expose communication of various EMV terminal device systems, such as the IC, magnetic strip, and/or NFC interfaces), an emulated hardware interface (e.g., such as one executed by one or more virtual machines), or a combination of interface types.

After the emulated interface is established, processing logic of the EMV terminal device emulator begins exchanging one or more communications with an EMV card emulator to process the transaction (processing block 412). As discussed herein, the EMV terminal device emulator and EMV card emulator generate data, responses to queries, etc. to process the initiated transaction according to a transaction flow (e.g. the flow executed by a vector kernel of the EMV terminal device emulator). Thus, processing logic of the EMV card emulator generates a simulated response to the EMV terminal device emulator in response to received communications (processing block 414), and provides the simulated response in communications exchanged with the EMV terminal device (processing block 416). The vector kernel executed by processing logic of the EMV terminal device emulator generates specific messages, data, requests, etc. according the transaction flow executed by the vector kernel. Therefore, as discussed herein, processing logic of the EMV card emulator is configured to, for each unique card that is simulated, generate appropriate response as would be generated by the logic of a physical EMV card (e.g., by the card's ICC or NFC interface).

The exchange of communications (processing blocks 412-416) continues until the EMV terminal device emulator concludes the transaction (processing block 418). For example, the process is concluded when the EMV terminal device emulator receives approval for the transaction, receives a transaction denial, performs a refund, or otherwise reaches the end of a simulated card present transaction.

Figure 4B:
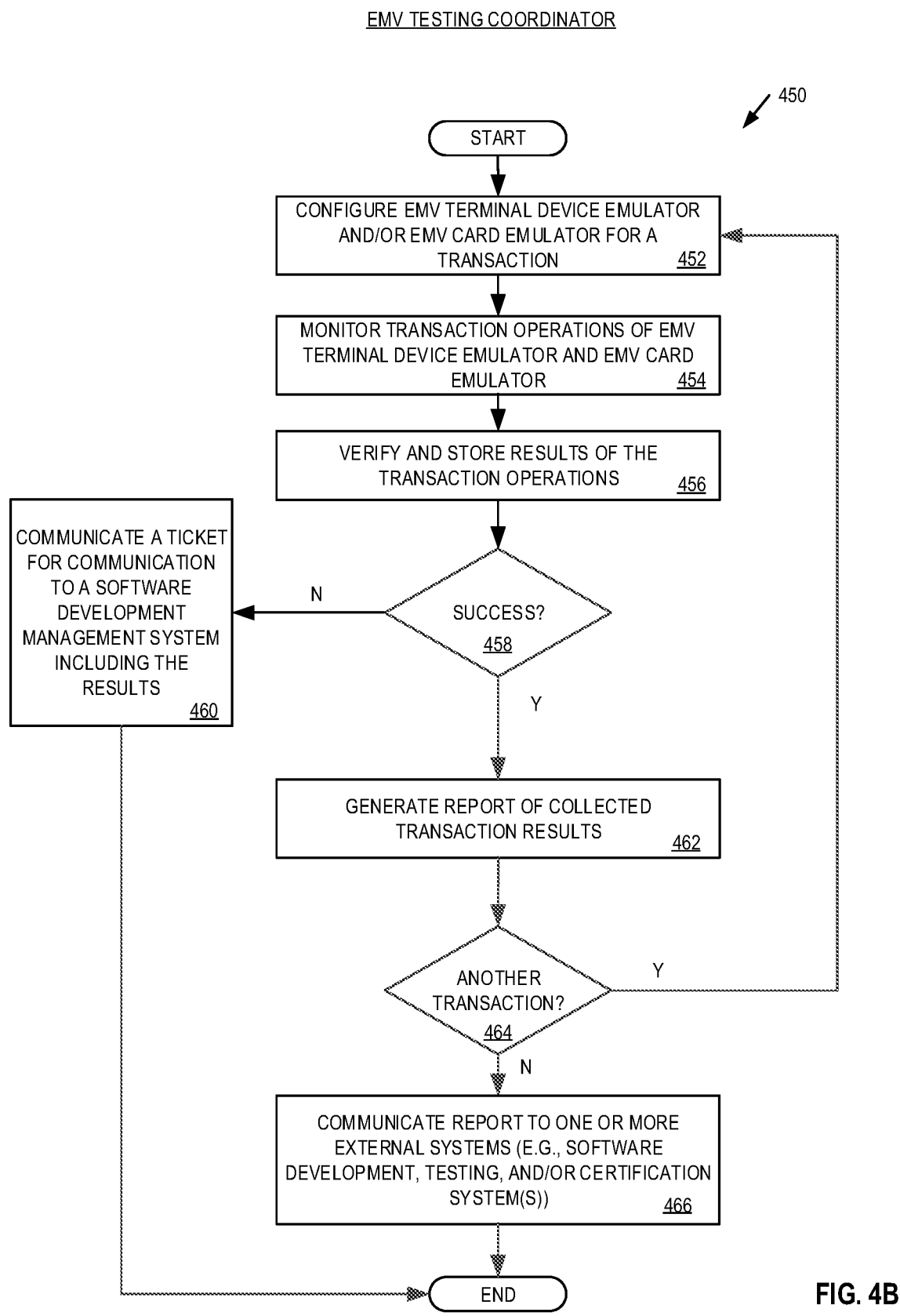
FIG. 4B is a block diagram of an embodiment of a process for an EMV testing coordinator enabling the simulation of a plurality of EMV card present transactions during testing using an EMV terminal device emulator and an EMV card emulator.

FIG. 4B is a block diagram of an embodiment of a process 450 for an EMV testing coordinator enabling the simulation of a plurality of EMV card present transactions during testing using an EMV terminal device emulator and an EMV card emulator. The process 450 is performed by processing logic that may comprise hardware (circuitry, dedicated logic, etc.), software (such as is run on a general-purpose computer system or a dedicated machine), firmware, or a combination thereof. In one embodiment, the process 450 is performed by an EMV testing coordinator (e.g., EMV testing coordinator 112 or 260) of an EMV testing system (e.g., EMV testing system 110 or 205).

Referring to FIG. 4B, processing logic of the EMV testing coordinator begins by configuring an EMV terminal device emulator and/or an EMV card emulator for a transaction (processing block 452). As discussed herein, the configuration can include configuration of a vector kernel for processing a transaction by the EMV terminal device emulator (e.g., an updated vector kernel received from a software development and testing system), configuration of hardware components of a terminal device (e.g., processor(s), memory, readers/interfaces, etc.), transaction details to be used by the EMV terminal device emulator when performing the transaction (e.g., amount, transaction type, accepted card types, etc.), and configurations of an emulated EMV card (e.g., card type, card brand, card numbers, interface configurations, an IC, an NFC interface, a magnetic strip, etc.), as discussed herein.

Processing logic monitors transaction operations of the EMV terminal device emulator, such as the operations performed by various processes of the vector kernel, operating system, and simulated hardware components of the EMV terminal device being emulated, and the EMV card emulator, such as the generation and communication of interactive and static data by the EMV card being simulated according to a present configuration (processing block 454). In embodiments, based on the configurations of the EMV terminal device emulator and the EMV card emulator, processing logic knows expected data to be generated during stages of the transaction, timing associated with the stages of the transaction, a sequence of messaging that is to occur during the transaction, etc. Thus, processing logic verifies and stores results of the transaction operations (processing block 456). When a transaction is not successful (processing block 458), such as timing requirements not being satisfied, messaging flow not being satisfied, wrong, incomplete, or inaccurate data being generated, operations failing, or other bugs encountered, processing logic communicates a ticket to a software development management system including the results (processing block 460). In embodiments, the ticket may specify the operation that failed, the stage of the transaction, an error messages, version of the vector kernel, stage of the vector kernels transaction flow where an error was encountered, as well as other data relevant to the detected failure of the transaction. The data in the ticket enables software developers responsible for the error to be routed the ticket by the software development and testing system for more efficient handling, as well as more granular details defining where an error occurred during transaction processing.

When a transaction is successful (processing block 458), processing logic generates a report of collected transaction results. In embodiments, the collection can include details associated with the transaction in the form of a settlement file, suitable for communication to an EMV certification and testing endpoint. Furthermore, because the transaction may be one of a plurality of transactions, such as a testing sequence for a specific card type, card brand, certification, etc., processing logic determines whether another transaction is to be run (processing block 464).

When one or more additional transactions are to be run, processing logic returns to processing block 452 to configure the EMV terminal device emulator and/or EMV card emulator for the specific transaction. However, when no additional transactions are to be run, such as when a testing sequence has concluded, processing logic communicates the report to one or more external systems, such as software development and testing systems and/or certification systems (processing block 466).

FIG. 5 is one embodiment of a computer system that may be used to support the systems and operations discussed herein. It will be apparent to those of ordinary skill in the art, however that other alternative systems of various system architectures may also be used.

The data processing system illustrated in FIG. 5 includes a bus or other internal communication means 515 for communicating information, and one or more processor(s) 510 coupled to the bus 515 for processing information. The system further comprises a random access memory (RAM) or other volatile storage device 550 (referred to as memory), coupled to bus 515 for storing information and instructions to be executed by processor(s) 510. Main memory 550 also may be used for storing temporary variables or other intermediate information during execution of instructions by processor(s) 510. The system also comprises a read only memory (ROM) and/or static storage device 520 coupled to bus 515 for storing static information and instructions for processor(s) 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor(s) 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

FIG. 6 is a block diagram of one embodiment of a terminal device. Terminal device 600 provides additional details for the EMV terminal devices emulated (e.g., terminal device emulators 120 and 210) as discussed herein. Examples of terminal device 600 include Verifone™ PIN pad devices, such as the VX 820, P400, P200, as well as other PIN pad reader devices offered by Verifone™ and other manufacturers of such devices. Additional examples of terminal device 600 include mobile reader devices, such as a BBPOS™ Chipper™, as well as mobile reader devices offered by BBPOS™ and other manufacturers of such devices.

In one embodiment, the terminal device 600 is a system, which may include a combination of one or more processor(s) 604, a memory 606, network interface 608, and card reader(s) 602 (e.g., magnetic strip readers, chip readers, NFC readers, etc.). Terminal device 600 may also include a number of processing modules, which may be implemented as hardware, software, firmware, or a combination. It should be appreciated that terminal device 600 may also include, although not illustrated, a user interface (e.g., keyboard, touch-screen, buttons, or similar user input devices), a power device (e.g., a battery), as well as other components typically associated with electronic devices. Network interface 608 of reader device may also be coupled to a number of wireless subsystems (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems).

Memory 606 may be coupled to processor(s) 604 in reader device to store instructions for execution by processor(s). In some embodiments, memory is non-transitory. It should be appreciated that embodiments as described herein may be implemented through the execution of instructions, for example as stored in the memory or other element, by processor(s) of the reader devices and/or other circuitry of the reader devices. Particularly, circuitry of the reader device, including but not limited to processor and card reader, may operate under the control of a program, routine, or the execution of instructions to execute methods or processes in accordance with the embodiments described herein. For example, such a program may be implemented in firmware or software (e.g. stored in memory and/or other locations) and may be implemented by processors, such as processor and card reader, and/or other circuitry of the reader devices. Further, it should be appreciated that the terms processor, microprocessor, circuitry, controller, etc., may refer to any type of logic or circuitry capable of executing logic, commands, instructions, software, firmware, functionality and the like.

It will be appreciated by those of ordinary skill in the art that any configuration of the system may be used for various purposes according to the particular implementation. The control logic or software implementing the described embodiments can be stored in main memory, mass storage device, or other storage medium locally or remotely accessible to processor.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for EMV terminal device testing using EMV card simulation when interacting with an EMV terminal device emulator, the method comprising:
    establishing, by an EMV card emulator, an interface with the EMV terminal device emulator for an exchange of EMV card present transaction communications between the EMV card emulator and the EMV terminal device emulator;

configuring, by an EMV testing coordinator, the EMV card emulator to simulate an EMV card for performing a transaction between the EMV card emulator and the simulated EMV terminal device emulator;

exchanging one or more communications with the EMV terminal device emulator via the interface, wherein each communication simulates a communication generated by a simulated integrated circuit of the simulated EMV card in response to a communication generated by the EMV terminal device emulator;

causing at least one transaction to be run using the simulated EMV card by the EMV terminal device emulator using the exchange of the one or more communications between the EMV card emulator and the EMV terminal device emulator; and verifying, by the EMV testing coordinator in response to the running of the at least one transaction, a result of the at least one transaction based at least in part on a comparison of actual communications exchanged between the EMV card emulator and the EMV terminal device emulator with expected communications exchanged between the EMV card emulator and the EMV terminal device emulator.

2. The method of claim 1, wherein the EMV card emulator is a first virtual machine that simulates at least a virtualized integrate circuit and/or a near field communications interface of the simulated EMV card, and wherein the EMV terminal device emulator is a second virtual machine comprising at least a virtualized EMV vector kernel.

3. The method of claim 2, wherein the interface is established after a software update to one or more of an operating system and an EMV vector kernel to be executed by the EMV terminal device emulator.

4. The method of claim 2, wherein the configuring further comprises:

setting one or more configuration options of the EMV terminal device emulator, the one or more configuration options comprising: a version of a virtualized EMV vector kernel of the EMV terminal device emulator to be used when processing the transaction, one or more virtualized hardware components of the EMV terminal device emulator to be used when processing the transaction, one or more transaction details to be used by the EMV terminal device emulator to be used when processing the transaction, or a combination thereof.

5. The method of claim 4, wherein the version of the virtualized EMV vector kernel of the EMV terminal device emulator to be used when processing the transaction comprises an updated version of the EMV vector kernel received by the EMV testing coordinator from a software development and testing system.

6. The method of claim 4, wherein the configuring further comprises:

setting one or more configuration options of the simulated EMV card, the one or more configuration options comprising: a card type, a card brand, one or more card numbers, one or more interface configurations of the near field communications interface, one or more integrated circuit configurations of the virtualized integrate circuit, a magnetic, or a combination thereof.

7. The method of claim 1, wherein the method further comprises:

monitoring, by the EMV testing coordinator, transaction operations of the EMV card emulator performed during a plurality of transactions using a plurality of simulated EMV cards, transaction operations performed by the EMV terminal device emulator performed during the plurality of transactions, and communications between the EMV card emulator and the EMV terminal device emulator during the plurality of transactions;

storing, in a memory, transaction performance data indicative the transaction operations performed by the EMV card, the transaction operations performed by the EMV terminal device emulator, and the communications; and verifying, by the EMV testing coordinator after the running of the at least one transaction, results of the plurality of transactions based on a comparison of the transaction performance data with corresponding expected transaction performance data.

8. The method of claim 7, wherein the transaction performance data comprises:

expected transaction operations performed by simulated EMV cards during the plurality of transactions including static and/or interactive data generated by the plurality of simulated EMV cards during the plurality of transactions, expected transaction operations performed by the EMV terminal device emulator during the plurality of transactions including operations performed by a vector kernel, an operating system, and simulated hardware components of the EMV terminal device emulator, and expected communications generated by a plurality of simulated integrated circuits of the plurality of simulated EMV cards and the EMV terminal device emulator during the transactions.

9. The method of claim 8, wherein the verifying further comprises:

verifying, by the EMV testing coordinator using the transaction performance data, (i) timing requirements for communications and processing operations performed by the simulated EMV card simulated by the EMV card emulator and the EMV terminal device emulator during the plurality of transactions, (ii) content of communications exchanged between the simulated EMV card simulated by the EMV card emulator and the EMV terminal device emulator during the plurality of transactions, (iii) an expected messaging flow between the simulated EMV card simulated by the EMV card emulator and the EMV terminal device emulator during the plurality of transactions, (iv) content of one or more messages exchanged between the simulated EMV card simulated by the EMV card emulator and the EMV terminal device emulator determined to have wrong, incomplete, or inaccurate data, (v) detection of one or more failures for operations expected to be performed by the simulated EMV card simulated by the EMV card emulator and the EMV terminal device emulator.

10. The method of claim 1, wherein the interface is a communications interface.

11. The method of claim 1, wherein a plurality of transactions are run by the EMV terminal device emulator and corresponding verification results collected in a settlement file, and wherein the settlement file is transmitted to a testing endpoint.

12. The method of claim 11, wherein the plurality of transactions comprise a plurality of transactions defined by a credit card provider system that provides the testing endpoint, and running of the plurality of transactions certify the proper functioning of software and/or hardware systems of the EMV terminal device to the credit card provider system.

13. The method of claim 1, further comprising:
when the result of the transaction cannot be verified as being correct, generating a notification for a software development system of a failed verification.

14. The method of claim 1, wherein the interface is a simulated hardware interface between the EMV card emulator and a simulated integrated circuit reader of the EMV terminal device emulator.

15. The method of claim 1, wherein the EMV card emulator establishes a first interface with the EMV terminal device emulator to simulate a first sequence of communications for a first type of EMV card present transaction, and wherein the EMV card emulator establishes a second interface with the EMV terminal device emulator to simulate a second sequence of communications for a second type of EMV card present transaction.

16. A non-transitory computer readable storage medium including instructions that, when executed by a processor, cause the processor to perform operations for EMV terminal device testing using EMV card simulation when interacting with an EMV terminal device emulator, the operations comprising:
establishing an interface with the EMV terminal device emulator for an exchange of EMV card present transaction communications between an EMV card emulator and the EMV terminal device emulator;
configuring the EMV card emulator to simulate an EMV card for performing a transaction between the EMV card emulator and the simulated EMV terminal device emulator;
exchanging one or more communications with the EMV terminal device emulator via the interface, wherein each communication simulates a communication generated by a simulated integrated circuit of the simulated EMV card in response to a communication generated by the EMV terminal device emulator;
causing at least one transaction to be run using the simulated EMV card by the EMV terminal device emulator using the exchange of the one or more communications between the EMV card emulator and the EMV terminal device emulator; and
verifying, in response to the running of the at least one transaction, a result of the at least one transaction based at least in part on a comparison of actual communications exchanged between the EMV card emulator and the EMV terminal device emulator with expected communications exchanged between the EMV card emulator and the EMV terminal device emulator.

17. A system for EMV terminal device testing using a simulated EMV card, comprising:
a memory; and
a processor coupled with the memory, the processor configured to:
establish an interface with the EMV terminal device emulator for an exchange of EMV card present transaction communications between an EMV card emulator and the EMV terminal device emulator,
configure the EMV card emulator to simulate an EMV card for performing a transaction between the EMV card emulator and the simulated EMV terminal device emulator,
exchange one or more communications with the EMV terminal device emulator via the interface, wherein each communication simulates a communication generated by a simulated integrated circuit of the simulated EMV card in response to a communication generated by the EMV terminal device emulator,
cause at least one transaction to be run using the simulated EMV card by the EMV terminal device emulator using the exchange of the one or more communications between the EMV card emulator and the EMV terminal device emulator, and
verify, in response to the at least one transaction being run, a result of the at least one transaction based at least in part on a comparison of actual communications exchanged between the EMV card emulator and the EMV terminal device emulator with expected communications exchanged between the EMV card emulator and the EMV terminal device emulator.

\* \* \* \* \*